United States Patent Office 2,998,402
Patented Aug. 29, 1961

2,998,402
PROCESS FOR DYEING AND COLORING IN THE MASS WITH PERLYENE DERIVATIVES
Georg Geiger and Karl Ulrich Steiner, Binningen, Switzerland, assignors to Sandoz A.G., Basel, Switzerland, a Swiss firm
No Drawing. Filed Oct. 20, 1958, Ser. No. 768,054
Claims priority, application Switzerland Oct. 29, 1957
11 Claims. (Cl. 260—37)

It has been found that the halogenated or unhalogenated condensation products of a halogenated or unhalogenated perylene-3,4,9,10-tetracarboxylic acid with ortho- or peri-arylene-diamines, which latter may contain further substituents, are highly suitable upon conversion into finely divided form for the coloring of lacquer media, printing inks and plastics, and for the dyeing of regenerated cellulose, cellulose ether, cellulose ester and synthetic polymer fibers in the mass.

Lacquers, plastics and the above named classes of manufactured fibers colored or dyed with these products possess good light fastness and good wet fastness properties. The dyestuffs show other interesting properties, e.g., good fastness to migration in polyvinyl chloride, provided they contain no more than two chlorine atoms in the molecule, good resistance to top coating finishes in lacquers, good fastness to overprinting in printing inks, high resistance to heat in all plastics, especially in polyamides (e.g. nylon, "Perlon," "Rilsan" (registered trade marks)) and polyesters (e.g. "Diolen," "Dacron," "Terylene" (registered trade marks)) in the melted state, and good fastness to chlorine bleaching and peroxide bleaching in spun-dyed acetate, polyamide and polyester fibers.

The dyestuffs have the general formulae:

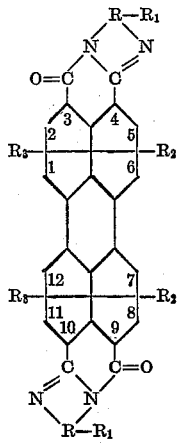

or

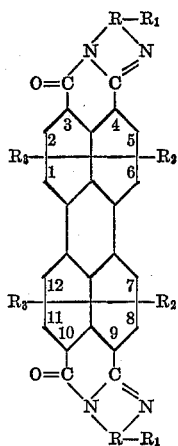

wherein
R stands for the radical of an ortho- or peri-arylene such as ortho-phenylene, 1,2- or 1,8-naphthylene,
$R_1$ for hydrogen, halogen, alkyl or alkoxy,
$R_2$ for hydrogen or halogen, and
$R_3$ for hydrogen or halogen.

These perylene derivatives are obtained by heating perylene-3,4,9,10-tetracarboxylic anhydride or its halogen derivatives with the corresponding diamines at temperatures of 150–250° C., if desired in inert solvents such as nitrobenzene, trichlorobenzene, or in alcohols of high boiling point (benzyl alcohol, lauryl alcohol), or in quinoline, etc., and if desired with the addition of dehydrating agents such as $ZnCl_2$ or similar products, or insolvents of low boiling point such as chlorobenzenes or water under pressure. Initially only one of the two amino groups reacts and the di-imine is formed then upon heating for a longer period or at a higher temperature the pyrimidine or the imidazole rings are closed. The condensation product thus formed can be subsequently halogenated if necessary, e.g. in concentrated sulfuric acid or chlorosulfonic acid in presence of a halogen carrier (iodine) at room temperature or a moderately high temperature.

It is preferable to bring the dyestuffs into a fine form before use, for example by reprecipitation from sulfuric acid, e.g. from the chlorination solution, or by grinding in presence of grinding assistants.

In the following table are listed some perylene derivatives which are suitable for dyeing and coloring in the mass. They are characterized by the starting materials used (columns I and II) and by the shade they give in polyvinyl chloride (column III).

TABLE

| Pigment dyestuff No. | Starting Materials | | Shade of Dyeing in Polyvinyl Chloride |
|---|---|---|---|
| | (I) | (II) | (III) |
| 1 | Perylene-3,4,9,10-tetracarboxylic anhydride. | 1,2-Diaminobenzene. | violet. |
| 2 | ----do---- | 1,2-Diamino-4-methylbenzene. | Do. |
| 3 | ----do---- | 1,2-Diamino-4-methoxybenzene. | Do. |
| 4 | ----do---- | 1,2-Diamino-4-chlorbenzene. | Do. |
| 5 | ----do---- | 1,2-Diaminonaphthalene. | reddish blue. |
| 6 | ----do---- | 1,8-Diaminonaphthalene. | Do. |
| 7* | Dichloroperylene-3,4,9,10-tetracarboxylic anhydride. | 1,2-Diaminobenzene. | reddish violet. |
| 8* | Tetrachloroperylene-3,4,9,10-tetracarboxylic anhydride. | 1,2-Diamino-4-methylbenzene. | Do. |
| 9 | Perylene-3,4,9,10-tetracarboxylic anhydride. | 1,2-Diaminobenzene. | Do. |
| 10 | ----do---- | ----do---- | Do. |
| 11 | ----do---- | ----do---- | Do. |
| 12 | Bromoperylene-3,4,9,10-tetracarboxylic anhydride. | ----do---- | Do. |

*Produced by the process of German Patent 441,587.
(9) After condensation 2 chlorine atoms are introduced into the dyestuff molecule.
(10) After condensation 1 chlorine atom is introduced into the dyestuff molecule.
(11) After condensation 1 bromine atom is introduced into the dyestuff molecule.

In the following examples the parts and percentages are by weight and the temperatures in degrees centigrade.

*Example 1*

0.1 part of the pigment dyestuff No. 1 of the table is wetted with 1 part of dioctyl phthalate and pasted with a spatula. 100 parts of a previously prepared mixture of 60 parts of polyvinyl chloride, 40 parts of dioctyl phthalate and the commonly used stabilizers are mixed with the paste. The mixture is gelatinized on a roller mill for 10 minutes at 140–150°. On a machine press the mass is pressed between polished plates heated to about 140°, giving a violet colored sheet which has excellent light fastness.

The colored sheets can be placed between uncolored sheets of polyvinyl chloride (composed of 70% polyvinyl chloride and 30% dioctyl phthalate) and stored for 72 hours at 70° without the dyestuff migrating into the white sheets.

*Example 2*

0.05 part of the pigment dyestuff No. 5 of the table and 100 parts of polystyrene molding powder are placed in a closed vessel and vigorously shaken for 10 minutes. The mixture is compounded on a roller mill, one roller of which is heated to 120° and the other to 150°, until the dyestuff is uniformly dispersed. The colored mass is allowed to cool and the particle size reduced to about 2–4 mm. by grinding in a suitable mill. It is then fed into an injection molding machine operating at 160–240° for the production of molded articles of any desired shape. They are of reddish blue color and show good fastness to light.

*Example 3*

In a closed vessel 0.05 part of the pigment dyestuff No. 3 of the table and 100 parts of polyethylene molding powder are vigorously agitated for 10 minutes. The mixture is worked up on a roller mill, one roller of which is heated to 150° and the other to 120°, until the dyestuff is homogeneously dispersed. After cooling, the mass is ground in a suitable mill to a particle size of about 2–4 mm. It is then molded into the desired articles on suitable equipment such as an extrusion or injection molder. The molded goods are of a violet color and have good color fastness properties.

*Example 4*

30 parts of pigment dyestuff No. 1 of the table are mixed with 5000 parts of nylon 66 and melted in the normal way, i.e. in a nitrogen atmosphere at about 285°. The thick liquid mass is spun to give a filament of violet shade with good fastness to light and wet treatments. It can be orientated and/or crimped and shrinkproofed by suitable heat treatments.

*Example 5*

30 parts of the pigment dyestuff No. 2 of the table are mixed with 5000 parts of "Diolen" (registered trademark) and melted in a nitrogen atmosphere at about 285° in the normal manner. The thick liquid mass is spun into a filament of violet shade which has good light and wet fastness. The filament can be subsequently orientated and/or crimped and shrinkproofed.

*Example 6*

A mixture of 100 parts of secondary cellulose acetate of 54–55% acetic acid content, 400 parts of acetone and 1 part of the pigment dyestuff No. 6 of the table are ground in a ball mill until the film formed by pouring a sample onto a glass plate is found by microscopic examination to contain only a negligible proportion of particles larger than 1μ. The mass is then spun into a reddish blue filament which is outstandingly fast to light and withstands all the normal textile processes without loss of color strength.

*Example 7*

1 part of the pigment dyestuff No. 2 of the table is compounded in suitable equipment, for example a roller mill, with 4 parts of water and if desired an addition of a dispersing agent such as sodium dinaphthylmethanedisulfonate. When the pigment paste is homogeneous it is stirred into 1170 parts of a viscose solution of 8.5% α-cellulose content. The colored viscose is spun in the normal way to give a violet filament of very good light and wet fastness.

The dyestuff can be brought into a finely divided form by reprecipitation from sulfuric acid or by grinding. It is washed to neutralize it or to eliminate the grinding assistants, as the case may be, and can then be pasted on the roller mill without intermediate drying.

*Example 8*

In a three-roller mill 1 part of the pigment dyestuff No. 4 of the table and 5 parts of aluminum hydroxide are pasted with sufficient boiled linseed oil to form a printing ink of the desired consistency. The ink gives violet colored prints on paper which have good fastness to light and overprinting.

*Example 9*

100 parts of a commercial nitrocellulose lacquer medium are colored with 2 parts of pigment dyestuff No. 8 of the table. The lacquer can be applied by spraying or dipping methods to give reddish violet coatings of excellent fastness to light and top finishes.

*Example 10*

1 part of the pigment dyestuff No. 1 of the table is dissolved in 10–20 parts of sulfuric acid of 90–100% concentration, if necessary with heating, and subsequently precipitated in 100 parts of water with vigorous stirring. The suspension so formed is filtered off, washed neutral with water and dried. The dyestuff is thereby obtained in a fine form which in many cases can be dispersed better and quicker in the medium to be colored.

*Example 11*

1 part of the pigment dyestuff No. 5 of the table is ground in a ball mill with 10 parts of a solid grinding assistant, e.g. common salt, potassium chloride, calcium chloride or carbonate, urea, phthalic acid or similar products, until the crystals of the raw dyestuff have largely disappeared. The mass is stirred into water with the addition of the necessary amount of hydrochloric acid or caustic soda respectively if an acid-soluble or alkali-soluble grinding assistant has been used. After filtration and washing to eliminate the grinding assistant, the dyestuff is obtained in a fine form which in many cases is dispersed in the medium more rapidly and better than otherwise.

*Example 12*

0.1 part of the pigment dyestuff No. 7 of the table is wetted with 1 part of dioctyl phthalate and pasted with a spatula. The paste is mixed with a previously prepared mixture of 60 parts of polyvinyl chloride, 40 parts of dioctyl phthalate and the commonly used stabilizers. The mixture is gelatinized on a roller mill in 10 minutes at 140–150° and then machine pressed between polished plates heated to about 140°. The plastic sheet or skin thus produced is of a reddish blue color which has excellent fastness to light and migration.

*Example 13*

30 parts of the pigment dyestuff No. 9 of the table are mixed with 5000 parts of "Rilsan" (registered trademark) and melted by the normal method in a nitrogen atmosphere at a temperature of about 230°. The thick liquid melt is spun into filament of reddish violet shade. It has good fastness to light, chlorine bleaching, peroxide bleaching and wet treatments, and can be orientated and/or crimped and shrinkproofed if desired.

Equally good results are obtained with dyestuffs Nos. 10 to 12.

Having thus disclosed the invention what we claim is:

1. In a process for the dyeing of fibers of synthetic polyamides and polyesters in the mass, the improvement which consists in carrying out the dyeing in the mass with a dyestuff of one of the formulae

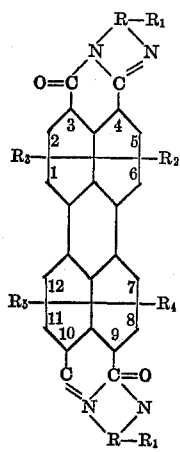

and

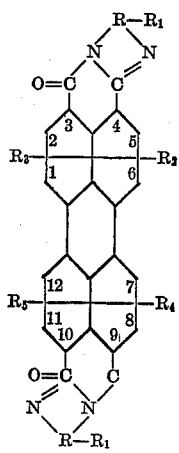

wherein R represents a member selected from the group consisting of 1.2-phenylene, 1.2-naphthylene and 1.8-naphthylene,
$R_1$ represents a member selected from the group consisting of hydrogen, chlorine, methyl and methoxy,
Each of $R_2$, $R_3$ and $R_4$ represents a member selected from the group consisting of hydrogen and chlorine, and
$R_5$ represents a member selected from the group consisting of hydrogen, chlorine and bromine.

2. A process according to claim 1 wherein the dyestuff is of the formula

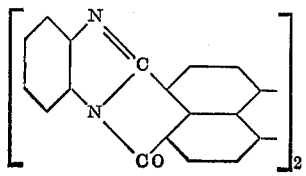

3. A process according to claim 1 wherein the dyestuff is of the formula

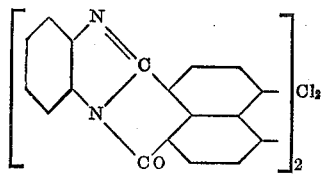

4. A process according to claim 1 wherein the dyestuff is of the formula

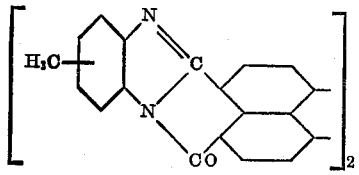

5. A process according to claim 1 wherein the dyestuff is of the formula

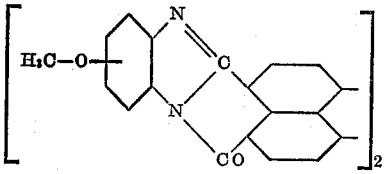

6. A process according to claim 1 which consists in the use of the dyestuff of the formula

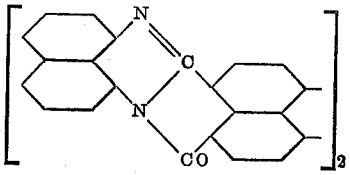

7. A process for dyeing synthetic polyamides and polyesters in the mass with a dyestuff as defined in claim 1, wherein the dyestuff is preliminarily intimately admixed with the material to be dyed, and then homogenization of the mixture completed at about the melting temperature of said material.

8. The process described in claim 1, wherein the fibers are of nylon.

9. Synthetic polyamide fibers, dyed in the mass with the dyestuff defined in claim 1.

10. Synthetic polyester fibers, dyed in the mass with the dyestuff defined in claim 1.

11. Nylon fibers dyed in the mass with the dyestuff claimed in claim 1.

References Cited in the file of this patent

UNITED STATES PATENTS

| | | |
|---|---|---|
| 1,808,260 | Schmidt et al. | June 2, 1931 |
| 1,878,986 | Schmidt et al. | Sept. 20, 1932 |
| 2,313,076 | Klinkenstein et al. | Mar. 9, 1943 |
| 2,571,319 | Waters et al. | Oct. 16, 1951 |

UNITED STATES PATENT OFFICE
CERTIFICATION OF CORRECTION

Patent No. 2,998,402                                 August 29, 1961

Georg Geiger et al.

It is hereby certified that error appears in the above numbered patent requiring correction and that the said Letters Patent should read as corrected below.

Column 2, line 15, for "insolvents" read -- in solvents --; column 5, lines 18 to 20, the lower part of the first formula should appear as shown below instead of as in the patent:

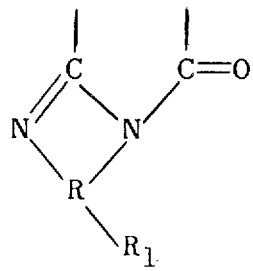

same column 5, lines 38 to 40, the lower part of the second formula should appear as shown below instead of as in the patent:

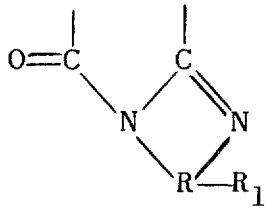

same column line 46, for "Each" read -- each --.

Signed and sealed this 24th day of April 1962.

(SEAL)
Attest:

ESTON G. JOHNSON
Attesting Officer

DAVID L. LADD
Commissioner of Patents